UNITED STATES PATENT OFFICE.

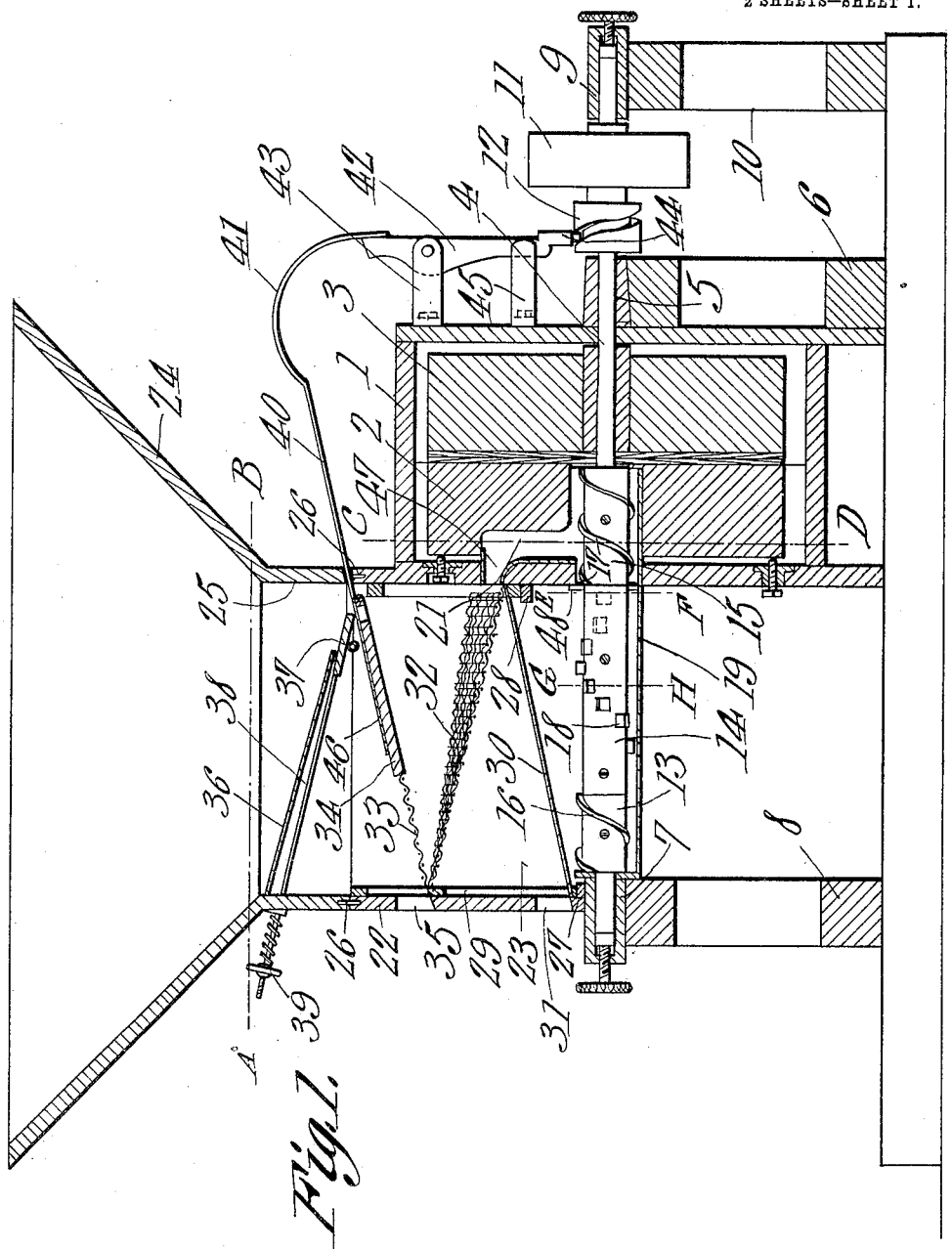

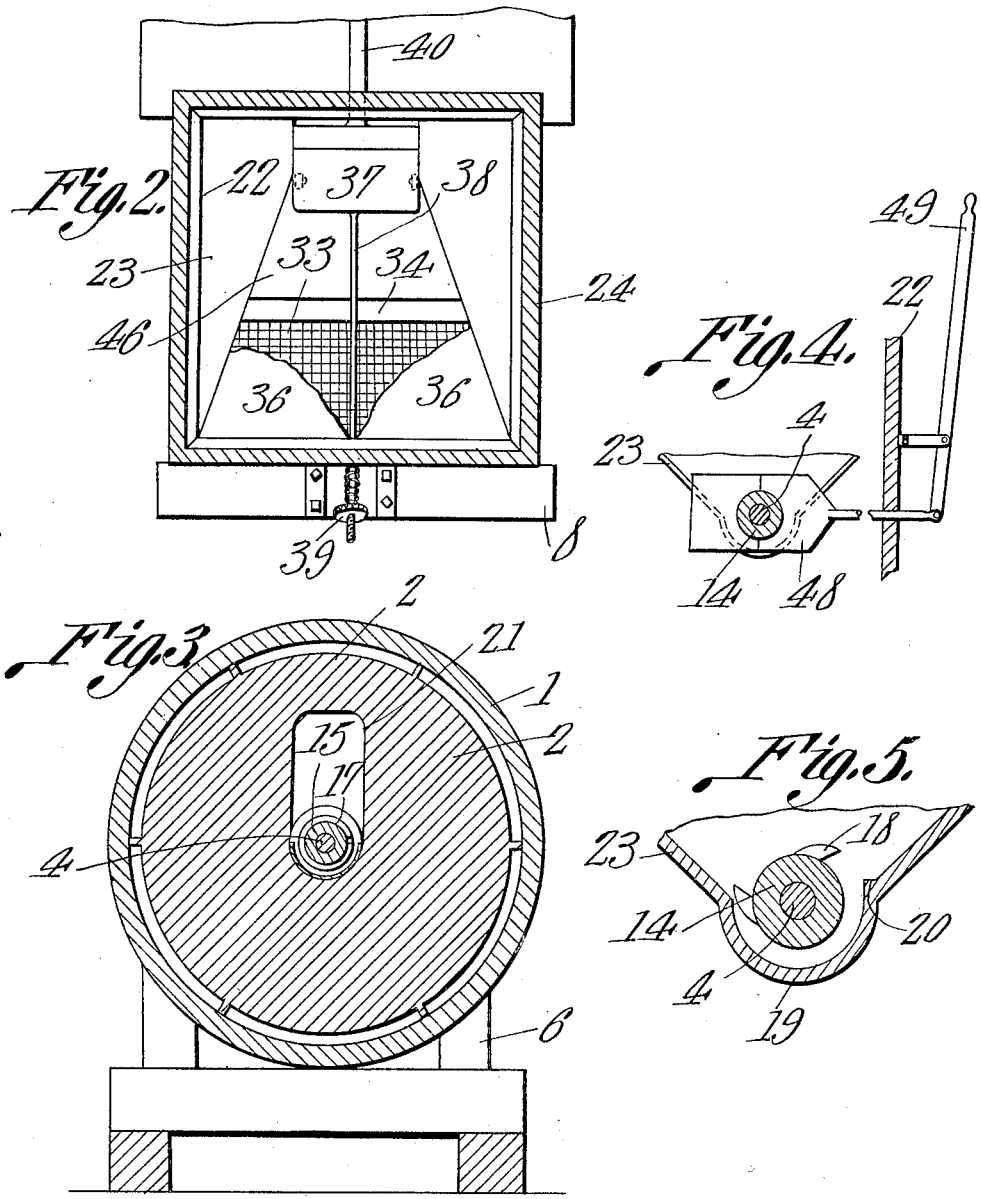

JAMES DUDLEY MOORE, OF NORTH WILKESBORO, NORTH CAROLINA, ASSIGNOR TO W. C. MEADOWS MILL CO., OF NORTH WILKESBORO, NORTH CAROLINA.

FEED-REGULATOR.

1,088,438. Specification of Letters Patent. Patented Feb. 24, 1914.

Application filed June 9, 1910. Serial No. 565,957.

*To all whom it may concern:*

Be it known that I, JAMES DUDLEY MOORE, a citizen of the United States, residing at North Wilkesboro, in the county of Wilkes and State of North Carolina, have invented a new and useful Feed-Regulator, of which the following is a specification.

This invention has reference to improvements in combined crushing and grinding mills, being designed especially for the production of feed for animals from corn on the cob and for the production of corn meal or like food products from corn removed from the cob, the mill being adapted to either operation at will and with a minimum of change.

In accordance with the present invention there is provided a grist mill of ordinary construction adapted to the production of feed from corn on the cob or the production of corn meal or like food from corn removed from the cob and in connection with the grist mill there is provided a crushing apparatus designed to receive corn on the cob and to cut or crush the cobs to a condition adapted to the mill, and there is also provided an attachment for the cleansing of shelled corn and the delivery of the same to the grist mill, such attachment being readily removable at will when it is desirable to use the mill for the production of feed from corn on the cob.

The invention will be best understood from a consideration of the following description taken in connection with the accompanying drawing forming a part of this specification, in which drawing:—

Figure 1 is a vertical axial section of the combined crushing and grinding mill with some parts shown in elevation. Fig. 2 is a section on the line A—B of Fig. 1 with remoter parts omitted. Fig. 3 is a section on the line C—D of Fig. 1. Fig. 4 is a section on the line E—F of Fig. 1. Fig. 5 is a section on the line G—H of Fig. 1.

Referring to the drawings there is shown a grist mill comprising a suitable casing 1 within which are mounted a fixed bur 2 and a rotatable bur 3. The bur 3 is carried by a shaft 4 having a journal bearing 5 in a frame 6 supporting the casing 1 and another journal bearing 7 in a frame 8 spaced from the casing 1 on the side thereof remote from the bearing 5. The shaft 4 is also provided with a bearing 9 on a frame 10 adjacent to but spaced from the frame 6 and between the frames 6 and 10 the shaft 4 carries a pulley 11 and a cam sleeve 12, the pulley 11 being provided for the application of power to the shaft 4 by a belt coming from any suitable prime mover, or the pulley 11 may be replaced by any suitable source of power such as an electric motor.

Between the bearing 7 and the bur 3 the shaft 4 has secured thereto sleeves 13, 14, 15, the sleeve 13 being adjacent to the bearing 7 and the sleeve 15 being interior to the bur 2 while the sleeve 14 is intermediate of the sleeves 13 and 15. The sleeve 13 has a peripheral helical flange 16 and the sleeve 15 has a like helical flange 17 exterior thereto, while the sleeve 14 has a helically arranged set of crushing or cutting teeth 18 preferably so disposed as to make one complete turn about the sleeve 14 from one end thereof to the other.

The sleeves 13, 14 and 15 are under-ridden by a conveyer trough 19 along one edge of which coincident with the sleeve 14 is a shoulder 20 in approximate shearing relation to the teeth 18 so that material engaged by the teeth 18 will be cut or crushed on reaching the shoulder 20. The helical arrangement of the teeth 18 tends to feed any material engaged by these teeth toward the bur 2 which is entered by the trough 19 the latter extending toward the face of the bur coincident with the matching face of the bur 3. Above the trough 19 the bur 2 is cutaway on the face remote from the active face of the bur to form a radial channel 21.

The casing 1 has the side adjacent to the bur 2 continued up above the top of the casing and this side there forms one side of a box 22, the bottom of which is connected by a hopper 23 to the trough 19 so that material introduced into the upper end of the box 22 if not prevented by the structure hereinafter described will gravitate to the hopper 23 and be directed to the trough 19. There is provided another hopper 24 having a discharge end 25 conforming to the upper end of the box 22 and held thereto by dowel pins 26 so that the hopper 24 may be readily attached to or removed from the box 22 at will. This forms a convenient means of joining the hopper 24 to the box 22 but does not preclude the use of other joining means if such be desirable.

On opposite inner walls of the box 22 there are provided ledges 27 28 respectively, the ledge 28 being against the wall of the box adjacent to the bur 2 and more elevated than the ledge 27. The ledges 27 and 28 are designed to support a frame 29 having at the bottom an impervious flooring 30 inclining from that side of the frame supported by the ledge 28 toward the side of the frame supported by the ledge 27 and where the lower end of the flooring 30 terminates there is formed a passage way 31 through the corresponding wall of the box 22.

Attached to the frame 29 adjacent to the end of the flooring 30 remote from the opening 31 is an inclined screen 32 extending upwardly toward the other side of the frame 29 where it is attached thereto and from this point there is provided a screen section 33 extending in divergent relation to the screen 32 toward the other side of the frame 29 this screen section 33 extending but part way across the frame 29 and joining a board 34 leading to the side of the frame 29 supported by the ledge 28. Where the screen 33 joins the frame 29 the box 22 is provided with an opening 35 from which material too coarse to pass through the screen 33 may find escape. The mouth end of the hopper 24 is provided with an inclined plate 36 leading toward but terminating short of the upper end of the board 34 and at this point there is provided a sliding gate 37 controlling the passage of material from the mouth end 25 of the hopper 24 to the board 34, this gate being under the control of a rod 38 extending through the side of the mouth end 25 of the hopper 24 and there provided with a manipulating screw wheel 39 by means of which the gate may be opened or closed or controlled at will.

Fast to the board 34 is a strip 40 extending through the mouth end of the hopper 24 where it joins the box 22 and this strip extends over and above the casing 1 and terminates in a bent portion 41 attached to one end of a lever 42 pivotally supported by a bracket 43 fast to the casing 1, while the other end of the lever 42 is formed into a finger 44 terminating in a stud entering the groove in the cam 12, the lever 42 being stiffened by guiding wings 45 fast on the casing 1. The end of the strip 40 within the box 22 carries a plate 46 overlying the board 34. The screen 32 discharges through an opening 47 in the casing 1 into the channel 21 in the bur 2 so that material discharged from the screen 32 finds its way into the portion of the trough 19 occupied by the sleeve 15.

Let it be assumed that the machine is assembled as illustrated in Fig. 1 and that a suitable quantity of shelled corn is present in the hopper 24 and let it also be assumed that power is applied to the shaft 4 by way of the pulley 11 so that the shaft 4 is rotating at a suitable speed. Now on opening the gate 37 the corn will gravitate onto the plate 46, the latter being reciprocated by the action of the cam 12 on the lever 42 imparting a rocking motion thereto which is transmitted through the strip 40 by way of the elastic section 41. This causes an agitation of the material flowing from the hopper 24 onto the plate 46 and this material is spread as it approaches the screen 33 through which the corn will fall onto the screen 32 while any material too large to pass through the meshes of the screen 33 will escape through the opening 35. The corn and any fine material accompanying the same on reaching the screen section 32 will gravitate along the same toward the opening 47, all fine material capable of passing through the meshes of the screen 32 finding its way to the floor 30 from which it is directed through the opening 31. The corn itself being too large to pass through the meshes of the screen 32 ultimately reaches the opening 27 and by way of the channel 21 passes to the conveyer sleeve 15 within the bur 2 and is fed by the latter to the bur 3 and is ground thereby in the usual manner.

The structure described cleanses the corn from stones and sticks and like deleterious matter too large to pass through the screen 33 while all fine matter is separated from the corn by the screen 32 so that the corn reaches the grist mill in a cleansed condition ready to be ground into meal suitable for food. If however it be desired to use the mill for the production of feed for cattle or for other purposes where the corn on the cob is utilized, then the hopper 24 is removed by lifting the same from the box 22, the plate 36 and gate 37 accompanying the hopper on the removal of the latter. Now on detaching the lever 42 the frame 29 may be lifted from the box 22 thus removing the board 34 and screens 33 and 32 and the flooring 30 thus leaving the box 22 free from interior obstruction. The corn on the cob may be introduced into the upper end of the box 22 and will fall to the lower end thereof being directed toward the trough 19 by the hopper 23.

When the machine is being used for the grinding of shelled corn it is desirable that no material which may have lodgment in the trough 19 in those portions occupied by the sleeves 13 and 14 shall find its way into the portion of the trough occupied by the sleeve 15 and for this purpose there is provided a gate 48 at the end of the sleeve 14 where it joins the sleeve 15, this gate being under the control of a manipulating lever 49 accessible from the exterior of the box 22. The gate 48 is closed when the machine is used for the grinding of shelled corn, but is opened when the machine is being used for the grinding of corn on the cob.

When corn on the cob is being introduced into the box 22 and gravitates into the lower end thereof it is kept away from the bearing 7 by the conveyer sleeve 13 and is fed thereby toward the cutting and crushing sleeve 14, the teeth 18 of which carry the corn on the cob against the shoulder 22 thus crushing the corn and the cobs into a condition of sufficient fineness to be fed to the burs 2, 3 so that the latter will grind the mixture of corn and corn cobs to the desired condition for the feeding of cattle or for such other uses to which it may be adapted.

It will be observed that the frame 29 and the parts carried thereby constitute a diverting means for material introduced into the structure whereby such material is directed away from the crushing mechanism and passes directly to the grinding mechanism without first passing through the crushing mechanism, the latter being excluded from action by the screening diverter carried by the frame 29.

What is claimed is:—

Feeding mechanism for mills including a shaft, a supporting board, an agitating element mounted for reciprocation on the board, a lever, revoluble means for oscillating the lever, and a spring strip connected at its ends to the agitating element and lever respectively for yieldingly reciprocating said element during the oscillation of the lever.

In testimony that I claim the foregoing as my own, I have hereto affixed my signature in the presence of two witnesses.

JAMES DUDLEY MOORE.

Witnesses:
FRANK B. OCHSENREITER,
WILLIAM CRICHTON CLARKE.

Copies of this patent may be obtained for five cents each, by addressing the "Commissioner of Patents, Washington, D. C."